United States Patent
Zhou et al.

(10) Patent No.: US 8,562,866 B2
(45) Date of Patent: Oct. 22, 2013

(54) PREPARATION METHOD OF ZINC MANGANESE SILICATE

(75) Inventors: Mingjie Zhou, Guangdong (CN); Shuxin Lu, Guangdong (CN); Wenbo Ma, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 0 days.

(21) Appl. No.: 13/640,353

(22) PCT Filed: Apr. 27, 2010

(86) PCT No.: PCT/CN2010/072221
§ 371 (c)(1),
(2), (4) Date: Oct. 10, 2012

(87) PCT Pub. No.: WO2011/134139
PCT Pub. Date: Nov. 3, 2011

(65) Prior Publication Data
US 2013/0028824 A1 Jan. 31, 2013

(51) Int. Cl.
*C09K 11/70* (2006.01)

(52) U.S. Cl.
USPC .................................. 252/301.6 R; 423/326

(58) Field of Classification Search
USPC .................................. 252/301.6 R; 423/326
See application file for complete search history.

(56) References Cited

FOREIGN PATENT DOCUMENTS

CN 101007945 A * 8/2007

* cited by examiner

*Primary Examiner* — Colleen Dunn
*Assistant Examiner* — Haytham Soliman
(74) *Attorney, Agent, or Firm* — Rosenberg, Klein & Lee

(57) ABSTRACT

A preparation method of zinc manganese silicate is provided. The method includes the following steps: step 1, preparing silicon dioxide sol with distilled water, anhydrous ethanol and tetraethyl orthosilicate; step 2, preparing a mixture solution of a zinc salt and a manganese salt; step 3, adjusting the silicon dioxide sol to be neutral or acidic; step 4, adding the mixture solution of the zinc salt and the manganese salt into the silicon dioxide sol to form a gelatin; step 5, drying the gelatin, keeping the temperature, grinding, reducing with keeping the temperature in a reductive atmosphere to obtain zinc manganese silicate. The preparation method has simple technique and low equipment requirement. The particles of the zinc manganese silicate phosphor prepared by the method have a regular size, uniform shape and good luminescent performance.

14 Claims, 4 Drawing Sheets

PREPARATION METHOD OF ZINC MANGANESE SILICATE

FIELD OF THE INVENTION

The present disclosure relates to fluorescent materials, and more particularly relates to a preparation method of zinc manganese silicate.

BACKGROUND OF THE INVENTION

As a luminous substrate, zinc silicate ($Zn_2SiO_4$) exhibits a good chemical stability, environmental adaptability, good moisture resistance, ease of preparation, and low price, such that it has drawn much attention in the research of luminescent materials. In 1939, Jenkins, et al. discovered that $Zn^{2+}$ ion and $Mn^{2+}$ ion have the same valence state and approximate ionic radius, and $Mn^{2+}$ ion can be well distributed in the lattice of $Zn_2SiO_4$ by X-ray, therefore manganese can be easily doped in the luminous substrate of $Zn_2SiO_4$.

Zinc manganese silicate ($Zn_2SiO_4$:Mn) is a high performance luminescent material, which has a high light intensive, color purity, and no near-infrared emission, such that it has been widely applied to some fields such as photoluminescence and cathodoluminescence. So far, the commercial zinc manganese silicate phosphor is prepared by solid phase method. However, the solid phase method suffers from some problems such as high synthesis temperature, difficulty in controlling the particle size and morphology, and requirement of grind of the product, which may cause surface damage and degradation of the luminescent properties, and contamination of the product. Therefore, in order to overcome the shortcomings caused by the solid phase method, some new synthetic methods have been extensively studied to synthetic zinc manganese silicate, such as sol-gel method, hydrothermal method and precipitation method.

SUMMARY OF THE INVENTION

Technical Problems

The technical problems to be solved by the present invention is to provide a low synthesis temperature preparation method of zinc manganese silicate, the particles of which have a regular size, uniform shape and good luminescent performance, so as to solve the problems caused by the solid phase method, such as high synthesis temperature, difficulty in controlling the particle size and morphology, and degradation of the luminescent properties of zinc manganese silicate caused by grind.

Technical Solutions

In order to solve the technical problems, a preparation method of zinc manganese silicate is provided, and includes the following steps:

step 1, mixing distilled water and anhydrous ethanol to prepare a mixture, adjusting the mixture to be alkaline, and adding tetraethyl orthosilicate to obtain a silicon dioxide sol;

step 2, weighting a zinc salt and a manganese salt, wherein the ratio of the sum of molar amount of zinc and manganese and the molar amount of tetraethyl orthosilicate from step 1 is 2:1, and preparing a mixture solution containing the zinc salt and the manganese salt by dissolving the zinc salt and the manganese salt into distilled water;

step 3, adjusting the silicon dioxide sol from step 1 to be neutral or acidic by nitric acid;

step 4, adding the mixture solution from step 2 into the silicon dioxide sol from step 3 slowly to react and form a gelatin; and step 5, drying the gelatin from step 4, thermal insulating and reacting the dried product at a temperature of 800° C. to 1200° C., taking out the dried product and grinding, thermal insulating and reducing the grinded product in a reductive atmosphere to obtain zinc manganese silicate.

In step 1, the volume ratio of distilled water and anhydrous ethanol is in a range of 1:5 to 2:1, a pH value of the alkaline mixture is 8 to 13. The volume ratio of tetraethyl orthosilicate and anhydrous ethanol is 1:12 to 1:1. The reaction is carried out in a water bath of 25° C. to 60° C. with stirring.

In step 2, the total ion concentration of zinc and manganese in the mixture solution containing the zinc salt and the manganese salt is 0.25 mol/L to 2 mol/L, the molar ratio of zinc and manganese is $(1-x):x$, wherein $0.02 \leq x \leq 0.15$. The zinc salt is selected from the group consisting of zinc acetate and zinc nitrate; the manganese is selected from the group consisting of manganese acetate, manganese nitrate, and manganese carbonate.

In step 3, a pH value of the silicon dioxide sol from step 1 is adjusted to from 2 to 7 by nitric acid with a concentration of 34 wt. %.

In step 4, the reaction is carried out in a water bath of 40° C. to 80° C. with stirring.

In step 5, the gelatin is dried at a temperature of 80° C. to 100° C. for 24 hours to 36 hours, and the dried product is thermal insulated and reacted at the temperature of 800° C. to 1200° C. for 2 hours to 6 hours. The grinded product is thermal insulated and reduced at a temperature of 800° C. to 1200° C. for 1 hour to 3 hours. The reductive atmosphere is carbon monoxide, or pure hydrogen, or a mixture of nitrogen and hydrogen.

Beneficial Effects

Compared to the prior art, the preparation method of the present invention is simple and has low equipment requirements. In addition, the particles of the zinc manganese silicate phosphor prepared by the method have a regular size and uniform shape, as well as a better the luminescent performance then conventional commercial zinc manganese silicate phosphor.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
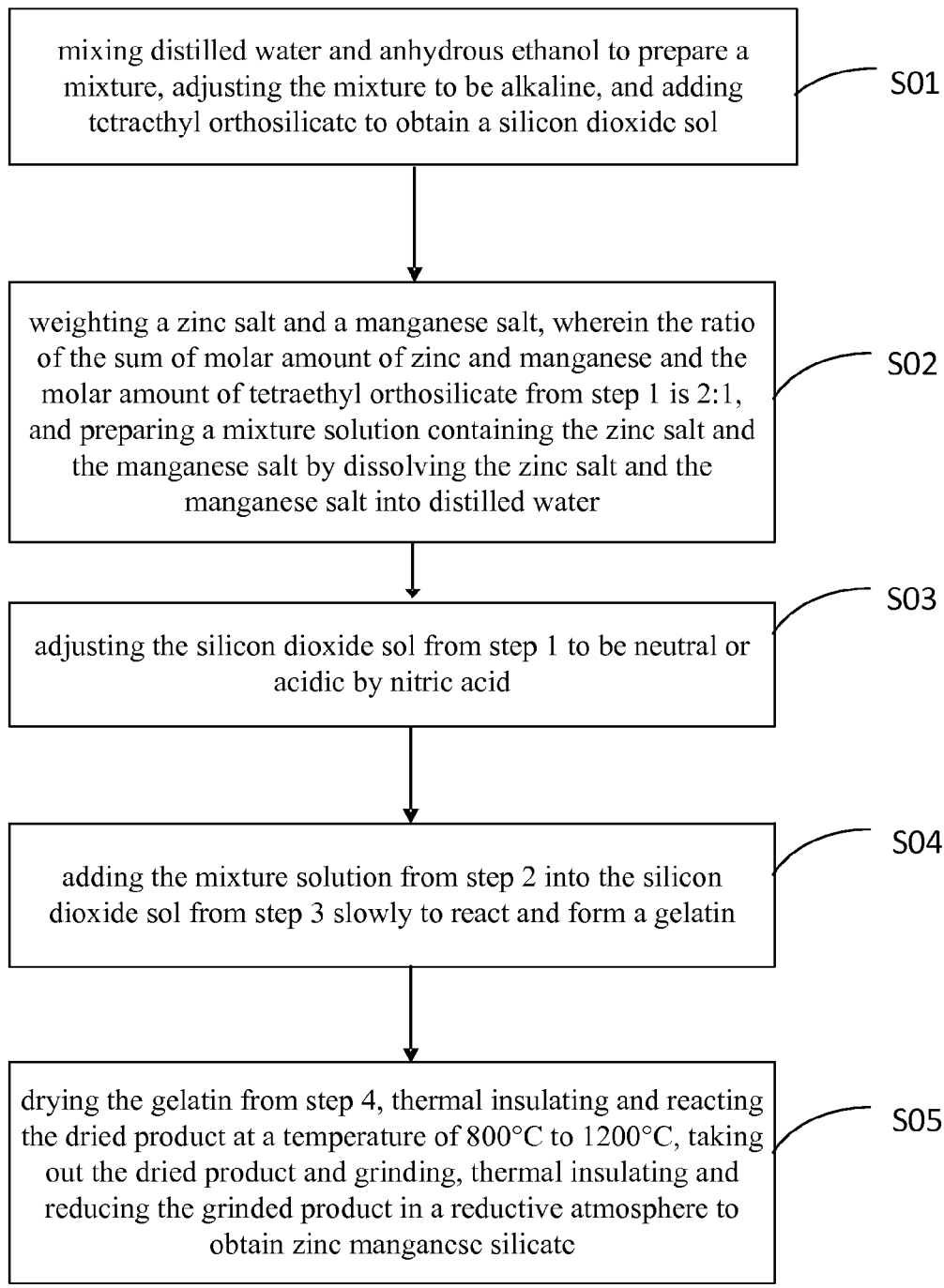
FIG. 1 is a flowchart of an embodiment of a preparation method of zinc manganese silicate of the present disclosure.

Referring to FIG. 1, an embodiment of a preparation method of zinc manganese silicate with regular partial size, uniform shape and good luminescent performance is disclosed, the method includes following steps:

Step S01, distilled water and anhydrous ethanol are mixed to prepare a mixture, the mixture is then adjusted to be alkaline utilizing ammonia, and tetraethyl orthosilicate (TEOS) is then added to obtain a silicon dioxide sol;

Step S02, a zinc salt and a manganese salt are weighted, wherein the ratio of the sum of molar amount of zinc and manganese and the molar amount of tetraethyl orthosilicate from step 1 is 2:1, and a mixture solution containing the zinc salt and the manganese salt is prepared by dissolving the zinc salt and the manganese salt into distilled water;

Step S03, the silicon dioxide sol from step 1 is adjusted to be neutral or acidic by nitric acid;

Step S04, the mixture solution from step 2 is added slowly into the silicon dioxide sol from step 3 to react and form a gelatin;

Step S05, the gelatin from step 4 is dried. The dried product is thermal insulated in an oven and reacted at a temperature of 800° C. to 1200° C. The dried product is removed from the oven and grinded, the grinded product is thermal insulated and reduced in a reductive atmosphere to obtain zinc manganese silicate.

According to the preparation method, in step S01, the volume ratio of distilled water and anhydrous ethanol is in a range of 1:5 to 2:1, a pH value of the alkaline mixture is 8 to 13. The volume ratio of tetraethyl orthosilicate and anhydrous ethanol is 1:12 to 1:1, and the reaction is carried out in a water bath of 25° C. to 60° C. with stirring. In step S02, the total ion concentration of zinc and manganese in the mixture solution containing the zinc salt and the manganese salt is 0.25 mol/L~2 mol/L, and the molar ratio of zinc and manganese is $(1-x):x$, wherein $0.02 \leq x \leq 0.15$. The zinc salt is selected from the group consisting of zinc acetate and zinc nitrate; the manganese is selected from the group consisting of manganese acetate, manganese nitrate, and manganese carbonate. In step S03, a pH value of the silicon dioxide sol from step 1 is adjusted to from 2 to 7 by nitric acid with a concentration of 34 wt. %. In step S04, the reaction is carried out in a water bath of 40° C. to 80° C. with stirring. In step S05, the gelatin is dried at a temperature of 80° C. to 100° C. for 24 hours to 36 hours, and the dried product is thermal insulated and reacted at the temperature of 800° C. to 1200° C. for 2 hours to 6 hours. The grinded product is thermal insulated and reduced at a temperature of 800° C. to 1200° C. for 1 hour to 3 hours. The reductive atmosphere is carbon monoxide, or pure hydrogen, or a mixture of nitrogen and hydrogen.

The preparation method according to the present disclosure is simple and has low equipment requirements. In addition, the particles of the zinc manganese silicate phosphor prepared by the method have a regular size and uniform shape, as well as a better the luminescent performance then conventional commercial zinc manganese silicate phosphor.

The following examples are described to illustrate the preparation method of zinc manganese silicate under different conditions.

EXAMPLE 1

Figure 2:
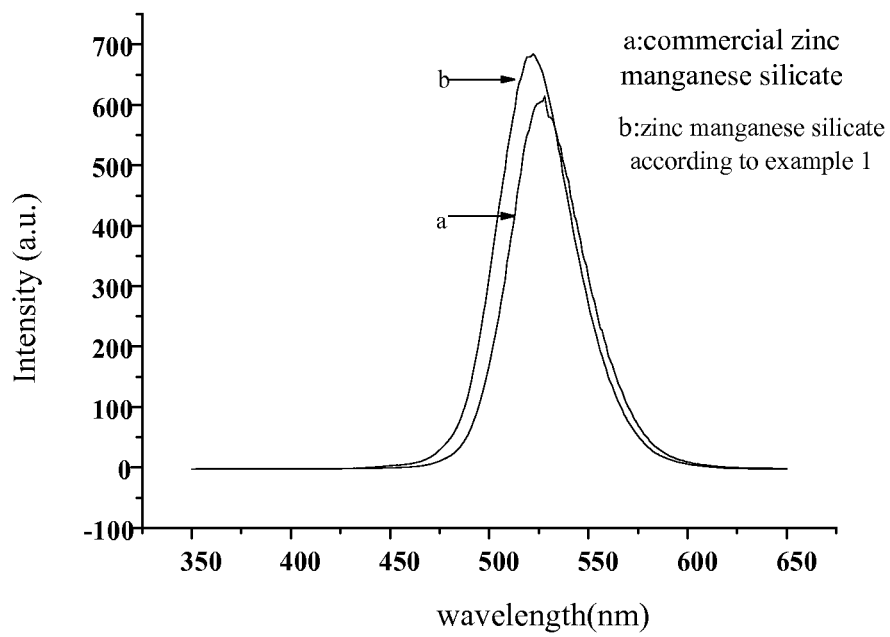
FIG. 2 shows a cathode ray excitation luminescence spectrum of the zinc manganese silicate according to example 1 comparing with a commercial zinc manganese silicate, both under a test voltage of 1.5 kV.

Step one, 6.69 ml of distilled water and 26.76 ml of ethanol were well mixed by a volume ratio of 1:4. The pH value of the mixture is then adjusted to 8 utilizing ammonia. 2.230 ml of TEOS was added according to a volume ratio of TEOS and anhydrous ethanol of 1:12. The mixture was stirred in a water bath of 60° C. to obtain a silicon dioxide sol. Step two, 5.831 g of zinc nitrate and 0.098 g of manganese acetate were weighted, where the ratio of the sum of molar amount of zinc and manganese and the molar amount of tetraethyl orthosilicate 1 is 2:1, and the molar ratio of zinc nitrate and manganese acetate is 0.98:0.02. The zinc nitrate and manganese acetate were dissolved into 20 ml of distilled water to prepare a mixture solution having a concentration of 1 mol/L. Step three, the pH value of silicon dioxide sol is adjusted to 2 utilizing nitric acid with a concentration of 34 wt. %. Step four, the mixture solution containing zinc nitrate and manganese acetate was added slowly into the silicon dioxide sol with the pH value of 2, the mixture solution was then stirred in a water bath of 80° C. and reacted to form a gelatin. Step five, the obtained gelatin was placed in a 60° C. oven and dried for 36 hours, the dried product was then placed in a high temperature furnace at 800° C. and thermal insulated and reacted for 6 hours, was then natural cooled to room temperature, grinded in an agate mortar. The grinded product was thermal insulated at 800° C. and reduced in pure hydrogen for 1 hour, was then cooled to room temperature to obtain $(Zn_{0.98}, Mn_{0.02})_2SiO_4$. A cathode ray excitation luminescence spectrum of the zinc manganese silicate prepared accordingly and a commercial zinc manganese silicate is shown in FIG. 2. It can be seen in FIG. 2 that the luminous intensity of the zinc manganese silicate of Example 1 exceeds that of the commercial zinc manganese silicate by about 12%.

EXAMPLE 2

Figure 3:
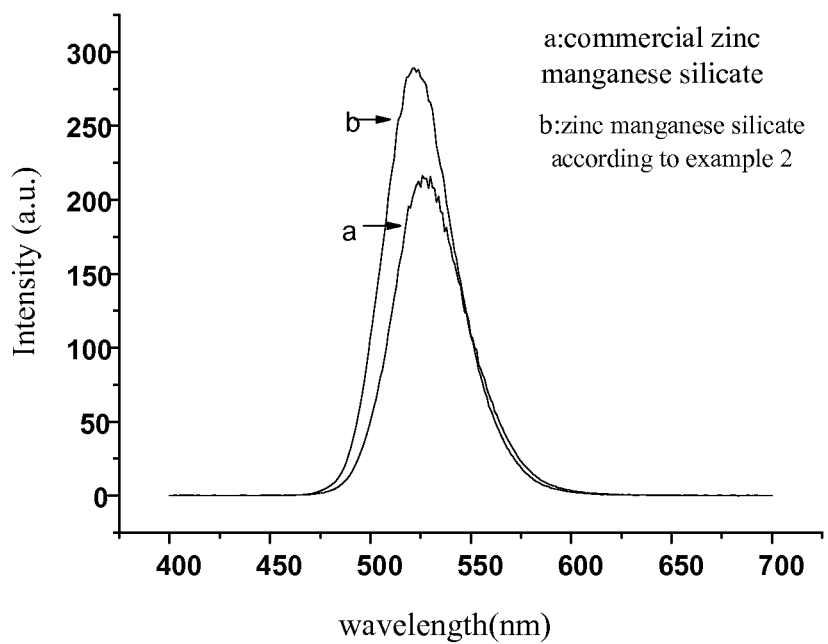
FIG. 3 shows a cathode ray excitation luminescence spectrum of the zinc manganese silicate according to example 2 comparing with a commercial zinc manganese silicate, both under a test voltage of 1.5 kV.

Step one, 2.23 ml of distilled water and 11.15 ml of ethanol were well mixed by a volume ratio of 1:5. The pH value of the mixture is then adjusted to 9 utilizing ammonia. 1.115 ml of TEOS was added according to a volume ratio of TEOS and anhydrous ethanol of 1:10. The mixture was stirred in a water bath of 50° C. to obtain a silicon dioxide sol. Step two, 2.1072 g of zinc acetate and 0.1004 g of high-purity manganese nitrate were weighted, where the ratio of the sum of molar amount of zinc and manganese and the molar amount of tetraethyl orthosilicate 1 is 2:1, and the molar ratio of zinc acetate and manganese nitrate is 0.96:0.04. The zinc acetate and manganese nitrate were dissolved into 40 ml of distilled water to prepare a mixture solution having a concentration of 0.25 mol/L. Step three, the pH value of silicon dioxide sol is adjusted to 3 utilizing nitric acid with a concentration of 34 wt. %. Step four, the mixture solution containing zinc acetate and manganese nitrate was added slowly into the silicon dioxide sol with the pH value of 3, the mixture solution was then stirred in a water bath of 80° C. and reacted to form a gelatin. Step five, the obtained gelatin was placed in a 80° C. oven and dried for 36 hours, the dried product was then placed in a high temperature furnace at 900° C. and thermal insulated and reacted for 4 hours, was then natural cooled to room temperature, grinded in an agate mortar. The grinded product was thermal insulated at 900° C. and reduced in carbon monoxide for 2 hours, was then cooled to room temperature to obtain $(Zn_{0.96},Mn_{0.04})_2SiO_4$. A cathode ray excitation luminescence spectrum of the zinc manganese silicate prepared accordingly and a commercial zinc manganese silicate is shown in FIG. 3. It can be seen in FIG. 3 that the luminous intensity of the zinc manganese silicate of Example 1 exceeds that of the commercial zinc manganese silicate by about 35%.

EXAMPLE 3

Figure 4:
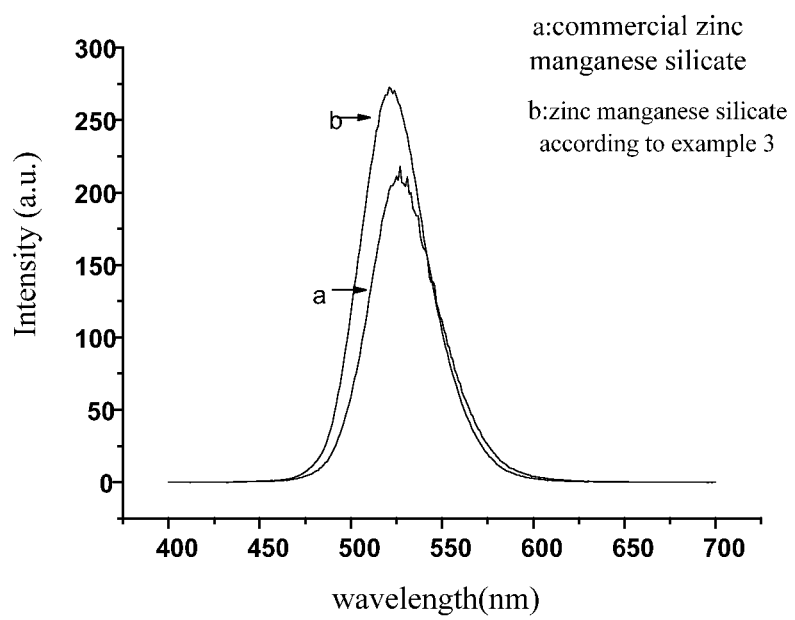
FIG. 4 shows a cathode ray excitation luminescence spectrum of the zinc manganese silicate according to example 3 comparing with a commercial zinc manganese silicate, both under a test voltage of 3.0 kV.

Step one, 17.84 ml of distilled water and 35.68 ml of ethanol were well mixed by a volume ratio of 1:2. The pH value of the mixture is then adjusted to 10 utilizing ammonia. 4.460 ml of TEOS was added according to a volume ratio of TEOS and anhydrous ethanol of 1:8. The mixture was stirred in a water bath of 40° C. to obtain a silicon dioxide sol. Step two, 8.341 g of zinc acetate and 0.490 g of manganese acetate were weighted, where the ratio of the sum of molar amount of zinc and manganese and the molar amount of tetraethyl orthosilicate 1 is 2:1, and the molar ratio of zinc acetate and manganese acetate is 0.95:0.05. The zinc nitrate and manganese acetate were dissolved into 20 ml of distilled water to prepare a mixture solution having a concentration of 2 mol/L. Step three, the pH value of silicon dioxide sol is adjusted to 5 utilizing nitric acid with a concentration of 34 wt. %. Step four, the mixture solution containing zinc acetate and manganese acetate was added slowly into the silicon dioxide sol with the pH value of 5, the mixture solution was then stirred in a water bath of 40° C. and reacted to form a gelatin. Step five, the obtained gelatin was placed in a 90° C. oven and dried for 32 hours, the dried product was then placed in a high temperature furnace at 1000° C. and thermal insulated and reacted for 3 hours, was then natural cooled to room temperature, grinded in an agate mortar. The grinded product was thermal insulated at 1000° C. and reduced in a mixture of 95 vol. % nitrogen and 5 vol. % hydrogen for 3 hours, was then cooled to room temperature to obtain $(Zn_{0.95},Mn_{0.05})_2SiO_4$. A cathode ray excitation luminescence spectrum of the zinc manganese silicate prepared accordingly and a commercial zinc manganese silicate is shown in FIG. 4. It can be seen in FIG. 4 that the luminous intensity of the zinc manganese silicate of Example 1 exceeds that of the commercial zinc manganese silicate by about 31%.

EXAMPLE 4

Figure 5:
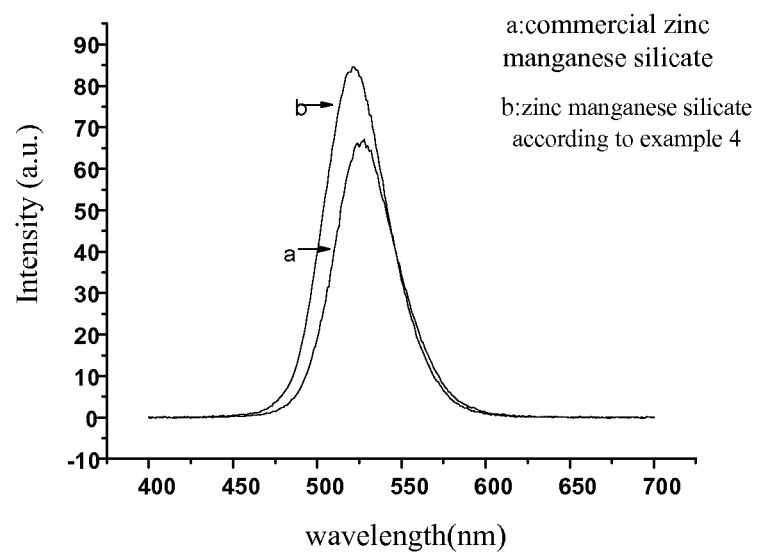
FIG. 5 shows a cathode ray excitation luminescence spectrum of the zinc manganese silicate according to example 4 comparing with a commercial zinc manganese silicate, both under a test voltage of 5.0 kV.

Step one, 8.92 ml of distilled water and 17.84 ml of ethanol were well mixed by a volume ratio of 1:2. The pH value of the mixture is then adjusted to 11 utilizing ammonia. 4.460 ml of TEOS was added according to a volume ratio of TEOS and anhydrous ethanol of 1:4. The mixture was stirred in a water bath of 50° C. to obtain a silicon dioxide sol. Step two, 8.0776 g of zinc acetate and 0.784 g of manganese acetate were weighted, where the ratio of the sum of molar amount of zinc and manganese and the molar amount of tetraethyl orthosilicate 1 is 2:1, and the molar ratio of zinc acetate and manganese acetate is 0.92:0.08. The zinc acetate and manganese acetate were dissolved into 20 ml of distilled water to prepare a mixture solution having a concentration of 2 mol/L. Step three, the pH value of silicon dioxide sol is adjusted to 5 utilizing nitric acid with a concentration of 34 wt. %. Step four, the mixture solution containing zinc nitrate and manganese acetate was added slowly into the silicon dioxide sol with the pH value of 5, the mixture solution was then stirred in a water bath of 50° C. and reacted to form a gelatin. Step five, the obtained gelatin was placed in a 90° C. oven and dried for 32 hours, the dried product was then placed in a high temperature furnace at 1100° C. and thermal insulated and reacted for 2 hours, was then natural cooled to room temperature, grinded in an agate mortar. The grinded product was thermal insulated at 1100° C. and reduced in a mixture of 95 vol. % nitrogen and 5 vol. % hydrogen for 2 hours, was then cooled to room temperature to obtain $(Zn_{0.92},Mn_{0.08})_2SiO_4$. A cathode ray excitation luminescence spectrum of the zinc manganese silicate prepared accordingly and a commercial zinc manganese silicate is shown in FIG. 5. It can be seen in FIG. 5 that the luminous intensity of the zinc manganese silicate of Example 1 exceeds that of the commercial zinc manganese silicate by about 28%.

EXAMPLE 5

Figure 6:
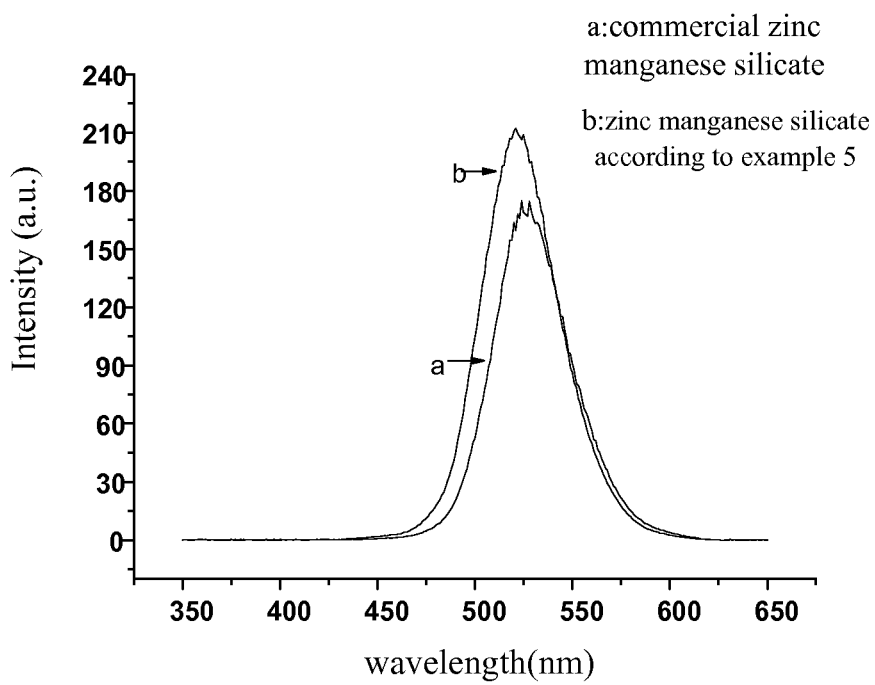
FIG. 6 shows a cathode ray excitation luminescence spectrum of the zinc manganese silicate according to example 5 comparing with a commercial zinc manganese silicate, both under a test voltage of 7.5 kV.

Step one, 20.07 ml of distilled water and 20.07 ml of ethanol were well mixed by a volume ratio of 1:1. The pH value of the mixture is then adjusted to 11 utilizing ammonia. 6.690 ml of TEOS was added according to a volume ratio of TEOS and anhydrous ethanol of 1:3. The mixture was stirred in a water bath of 50° C. to obtain a silicon dioxide sol. Step two, 12.1164 g of zinc acetate and 1.176 g of manganese acetate were weighted, where the ratio of the sum of molar amount of zinc and manganese and the molar amount of tetraethyl orthosilicate 1 is 2:1, and the molar ratio of zinc acetate and manganese acetate is 0.92:0.08. The zinc acetate and manganese acetate were dissolved into 20 ml of distilled water to prepare a mixture solution having a concentration of 1.5 mol/L. Step three, the pH value of silicon dioxide sol is adjusted to 5 utilizing nitric acid with a concentration of 34 wt. %. Step four, the mixture solution containing zinc nitrate and manganese acetate was added slowly into the silicon dioxide sol with the pH value of 5, the mixture solution was then stirred in a water bath of 50° C. and reacted to form a gelatin. Step five, the obtained gelatin was placed in a 90° C. oven and dried for 32 hours, the dried product was then placed in a high temperature furnace at 1100° C. and thermal insulated and reacted for 2 hours, was then natural cooled to room temperature, grinded in an agate mortar. The grinded product was thermal insulated at 1100° C. and reduced in a mixture of 95 vol. % nitrogen and 5 vol. % hydrogen for 2 hours, was then cooled to room temperature to obtain $(Zn_{0.92},Mn_{0.08})_2SiO_4$. A cathode ray excitation luminescence spectrum of the zinc manganese silicate prepared accordingly and a commercial zinc manganese silicate is shown in FIG. 6. It can be seen in FIG. 6 that the luminous intensity of the zinc manganese silicate of Example 1 exceeds that of the commercial zinc manganese silicate by about 26%.

EXAMPLE 6

Figure 7:
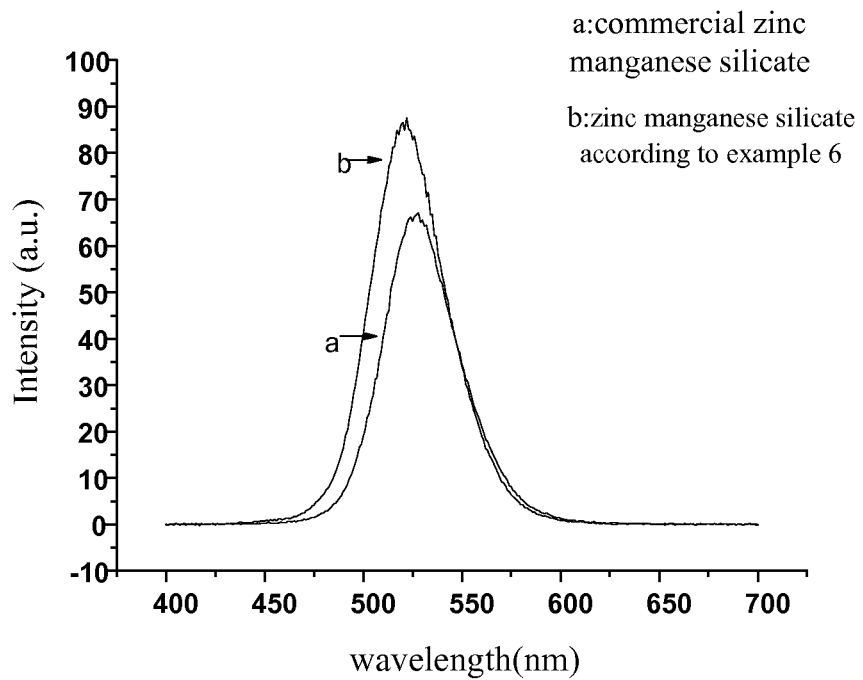
FIG. 7 shows a cathode ray excitation luminescence spectrum of the zinc manganese silicate according to example 6 comparing with a commercial zinc manganese silicate, both under a test voltage of 5.0 kV.

Step one, 17.84 ml of distilled water and 8.92 ml of ethanol were well mixed by a volume ratio of 2:1. The pH value of the mixture is then adjusted to 13 utilizing ammonia. 8.920 ml of TEOS was added according to a volume ratio of TEOS and anhydrous ethanol of 1:1. The mixture was stirred in a water bath of 25° C. to obtain a silicon dioxide sol. Step two, 15.804 g of zinc acetate and 1.960 g of manganese acetate were weighted, where the ratio of the sum of molar amount of zinc and manganese and the molar amount of tetraethyl orthosilicate 1 is 2:1, and the molar ratio of zinc acetate and manganese acetate is 0.90:0.1. The zinc acetate and manganese acetate were dissolved into 40 ml of distilled water to prepare a mixture solution having a concentration of 2 mol/L. Step three, the pH value of silicon dioxide sol is adjusted to 5 utilizing nitric acid with a concentration of 34 wt. %. Step four, the mixture solution containing zinc nitrate and manganese acetate was added slowly into the silicon dioxide sol with the pH value of 5, the mixture solution was then stirred in a water bath of 50° C. and reacted to form a gelatin. Step five, the obtained gelatin was placed in a 100° C. oven and dried for 24 hours, the dried product was then placed in a high temperature furnace at 1100° C. and thermal insulated and reacted for 2 hours, was then natural cooled to room temperature, grinded in an agate mortar. The grinded product was thermal insulated at 1100° C. and reduced in a mixture of 95 vol. % nitrogen and 5 vol. % hydrogen for 2 hours, was then cooled to room temperature to obtain $(Zn_{0.90},Mn_{0.10})_2SiO_4$. A cathode ray excitation luminescence spectrum of the zinc manganese silicate prepared accordingly and a commercial zinc manganese silicate is shown in FIG. 7. It can be seen in FIG. 7 that the luminous intensity of the zinc manganese silicate of Example 1 exceeds that of the commercial zinc manganese silicate by about 33%.

EXAMPLE 7

Step one, 4.46 ml of distilled water and 8.92 ml of ethanol were well mixed by a volume ratio of 1:1. The pH value of the mixture is then adjusted to 11 utilizing ammonia. 4.460 ml of TEOS was added according to a volume ratio of TEOS and anhydrous ethanol of 1:2. The mixture was stirred in a water bath of 50° C. to obtain a silicon dioxide sol. Step two, 7.463 g of zinc acetate and 0.690 g of manganese carbonate were weighted, where the ratio of the sum of molar amount of zinc and manganese and the molar amount of tetraethyl orthosilicate 1 is 2:1, and the molar ratio of zinc acetate and manganese carbonate is 0.85:0.15. The zinc acetate and manganese carbonate were dissolved into 40 ml of distilled water to prepare a mixture solution having a concentration of 1 mol/L. Step three, the pH value of silicon dioxide sol is adjusted to 7 utilizing nitric acid with a concentration of 34 wt. %. Step four, the mixture solution containing zinc nitrate and manganese carbonate was added slowly into the silicon dioxide sol with the pH value of 7, the mixture solution was then stirred in a water bath of 40° C. and reacted to form a gelatin. Step five, the obtained gelatin was placed in a 100° C. oven and dried for 24 hours, the dried product was then placed in a high temperature furnace at 1200° C. and thermal insulated and reacted for 2 hours, was then natural cooled to room temperature, grinded in an agate mortar. The grinded product was thermal insulated at 1200° C. and reduced in carbon monoxide for 2 hours, was then cooled to room temperature to obtain $(Zn_{0.85},Mn_{0.15})_2SiO_4$.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A preparation method of zinc manganese silicate, comprising following steps:
    step 1, mixing distilled water and anhydrous ethanol to prepare a mixture, adjusting the mixture to be alkaline, and adding tetraethyl orthosilicate to obtain a silicon dioxide sol;
    step 2, weighting a zinc salt and a manganese salt, wherein the ratio of the sum of molar amount of zinc and manganese and the molar amount of tetraethyl orthosilicate from step 1 is 2:1, and preparing a mixture solution containing the zinc salt and the manganese salt by dissolving the zinc salt and the manganese salt into distilled water;
    step 3, adjusting the silicon dioxide sol from step 1 to be neutral or acidic by nitric acid;
    step 4, adding the mixture solution from step 2 into the silicon dioxide sol from step 3 slowly to react and form a gelatin; and
    step 5, drying the gelatin from step 4, thermal insulating and reacting the dried product at a temperature of 800° C. to 1200° C., taking out the dried product and grinding, thermal insulating and reducing the grinded product in a reductive atmosphere to obtain zinc manganese silicate.

2. The preparation method of zinc manganese silicate according to claim 1, wherein in step 1, the volume ratio of distilled water and anhydrous ethanol is in a range of 1:5 to 2:1, a pH value of the alkaline mixture is 8 to 13.

3. The preparation method of zinc manganese silicate according to claim 1, wherein in step 1, the volume ratio of tetraethyl orthosilicate and anhydrous ethanol is 1:12 to 1:1, the reaction is carried out in a water bath of 25° C. to 60° C. with stirring.

4. The preparation method of zinc manganese silicate according to claim 2, wherein in step 1, the volume ratio of tetraethyl orthosilicate and anhydrous ethanol is 1:12 to 1:1, the reaction is carried out in a water bath of 25° C. to 60° C. with stirring.

5. The preparation method of zinc manganese silicate according to claim 1, wherein in step 2, the total ion concentration of zinc and manganese in the mixture solution containing the zinc salt and the manganese salt is 0.25 mol/L to 2 mol/L, the molar ratio of zinc and manganese is $(1-x):x$ wherein $0.02 \leq x \leq 0.15$.

6. The preparation method of zinc manganese silicate according to claim 1, wherein in step 2, the zinc salt is selected from the group consisting of zinc acetate and zinc nitrate; the manganese is selected from the group consisting of manganese acetate, manganese nitrate, and manganese carbonate.

7. The preparation method of zinc manganese silicate according to claim 5, wherein in step 2, the zinc salt is selected from the group consisting of zinc acetate and zinc nitrate; the manganese is selected from the group consisting of manganese acetate, manganese nitrate, and manganese carbonate.

8. The preparation method of zinc manganese silicate according to claim 1, wherein in step 3, a pH value of the silicon dioxide sol from step 1 is adjusted to from 2 to 7 by nitric acid with a concentration of 34 wt. %.

9. The preparation method of zinc manganese silicate according to claim 1, wherein in step 4, the reaction is carried out in a water bath of 40° C. to 80° C. with stirring.

10. The preparation method of zinc manganese silicate according to claim 1, wherein in step 5, the gelatin is dried at a temperature of 80° C. to 100° C. for 24 hours to 36 hours, and the dried product is thermal insulated and reacted at the temperature of 800° C. to 1200° C. for 2 hours to 6 hours.

11. The preparation method of zinc manganese silicate according to claim 1, wherein in step 5, the grinded product is thermal insulated and reduced at a temperature of 800° C. to 1200° C. for 1 hour to 3 hours.

12. The preparation method of zinc manganese silicate according to claim 10, wherein in step 5, the grinded product is thermal insulated and reduced at a temperature of 800° C. to 1200° C. for 1 hour to 3 hours.

13. The preparation method of zinc manganese silicate according to claim 11, wherein the reductive atmosphere is carbon monoxide, or pure hydrogen, or a mixture of nitrogen and hydrogen.

14. The preparation method of zinc manganese silicate according to claim 12, wherein the reductive atmosphere is carbon monoxide, or pure hydrogen, or a mixture of nitrogen and hydrogen.

* * * * *